Oct. 26, 1926. 1,604,234
G. J. MEAD
MOLD AND ARTICLE HANDLING DEVICE
Filed May 15, 1922 3 Sheets-Sheet 3
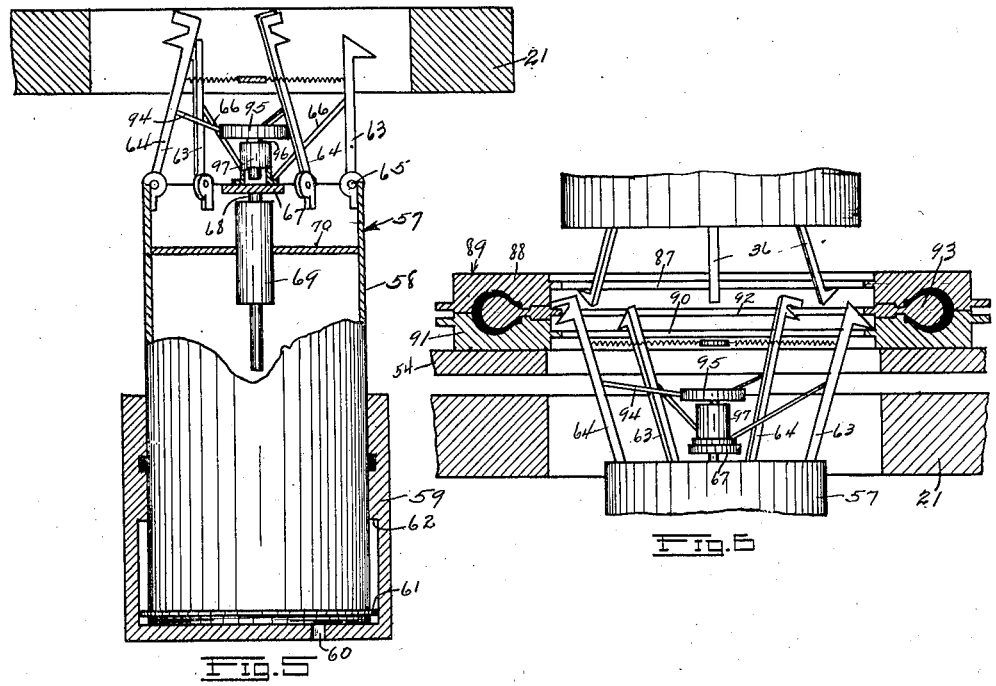
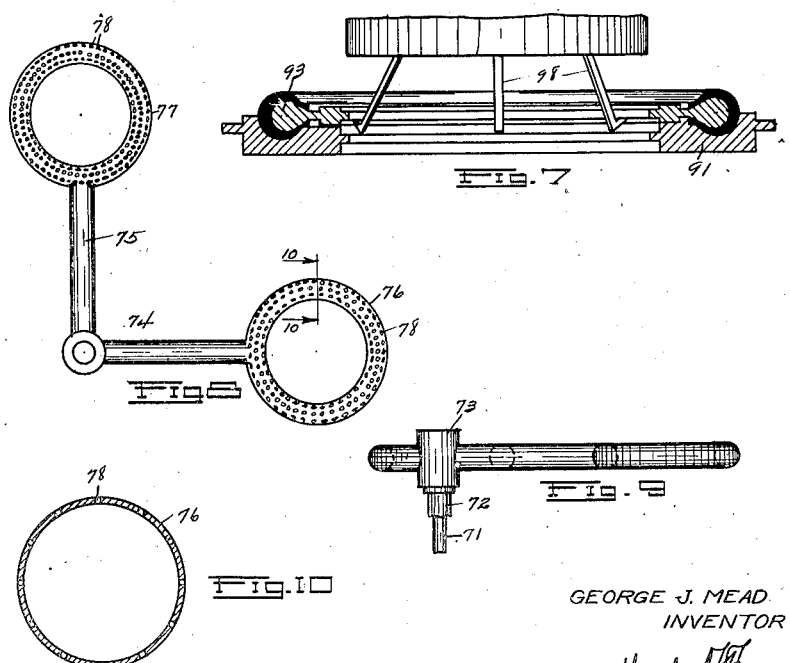
GEORGE J. MEAD
INVENTOR
BY Hadley Freeman
ATTORNEY Patented Oct. 26, 1926.

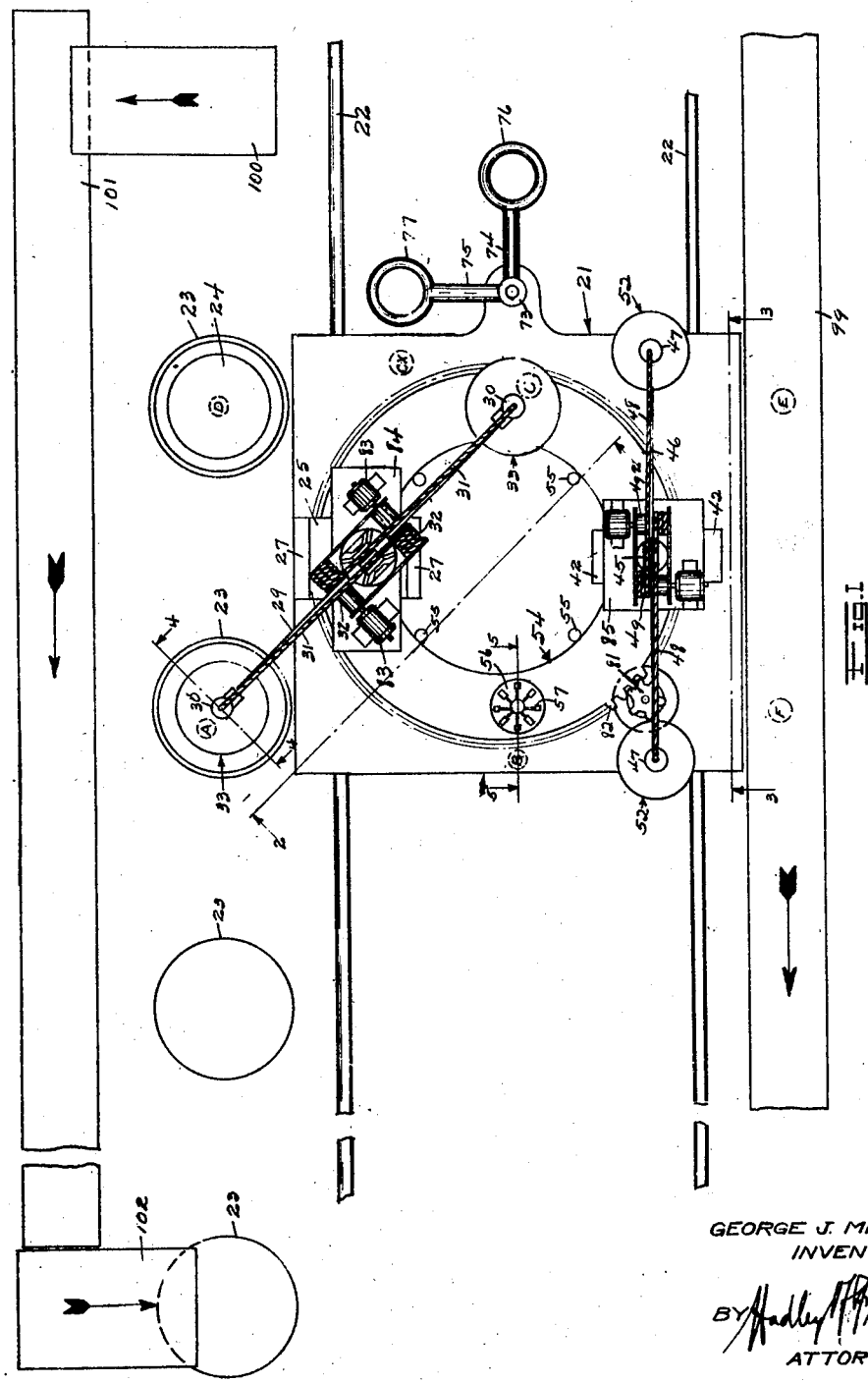

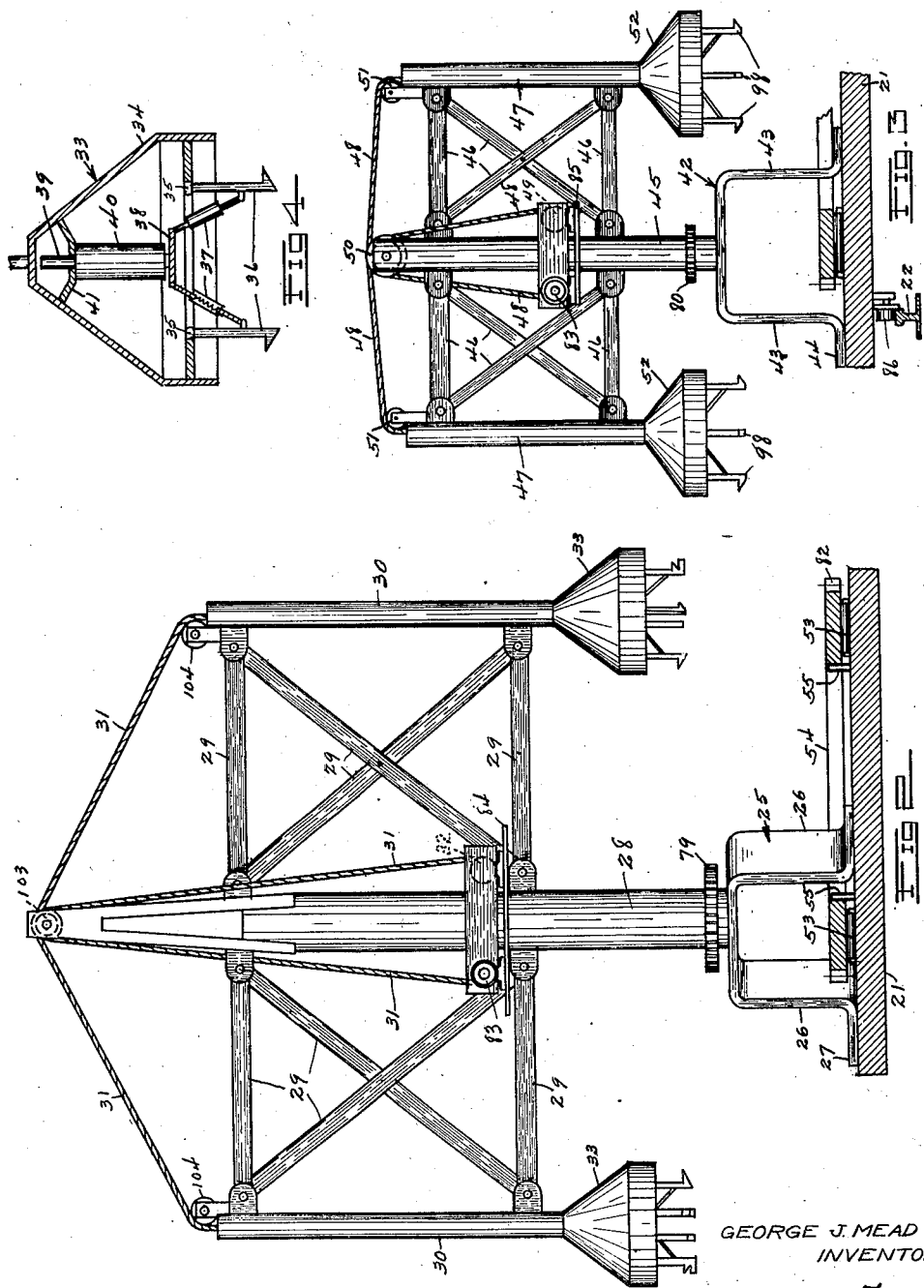

1,604,234

UNITED STATES PATENT OFFICE.

GEORGE J. MEAD, OF CHICAGO, ILLINOIS, ASSIGNOR TO THE FISK RUBBER COMPANY, OF CHICOPEE FALLS, MASSACHUSETTS, A CORPORATION OF MASSACHUSETTS.

MOLD AND ARTICLE HANDLING DEVICE.

Application filed May 15, 1922. Serial No. 561,145.

At the present time pneumatic tires are usually vulcanized in molds which are placed in a heater and because of the weight and temperature of the molds considerable difficulty is experienced in handling them. My invention provides means for expeditiously removing the molds from one heater, removing the tires from the molds, cleaning the molds, placing uncured tires into the molds, and placing the molds in a second heater. In the drawings accompanying this specification and forming a part thereof I have shown, for purposes of illustration, one form which my invention may assume. In these drawings:

Figure 1 represents a general plan view of this illustrative embodiment of my invention, Figure 2 is a fragmentary section on the line 2—2 of Figure 1, Figure 3 is a fragmentary section on the line 3—3 of Figure 1, Figure 4 is a section on the line 4—4 of Figure 1, Figure 5 is a section on the line 5—5 of Figure 1, Figure 6 is a section similar to Figure 5 showing the parts in different position and additional parts co-operating therewith, Figure 7 shows the cured tire being lifted from the lower half of the mold, Figure 8 is a plan view of the cleaning mechanism, Figure 9 is a side view thereof, while Figure 10 is a section on the line 10—10 of Figure 8.

The device herein disclosed comprises a carriage 21 suitably mounted to roll on a track 22 positioned parallel to and adjacent a row of heaters 23 which may be of the usual type having a ram 24 on which the molds are supported and which may be raised to press the molds against the heater cover to effect complete closure of the molds.

On this carriage 21 is mounted a platform 25 spaced from the main carriage 21 by legs 26 and secured thereto by feet 27 and supported on this platform 25 is a tower 28 to which are secured by suitable supports 29 a pair of columns 30 through which pass cables 31 leading from winches 32 over pulleys 103 and 104 through the columns 30 to grippers 33. Each gripper 33 comprises a frame 34 to which are pivotally secured at 35 a plurality of hooks 36 adapted to be operated by rods 37 secured to a cross-head 38 carried by the plunger 39 of a solenoid 40 which is secured to and mounted upon a bracket 41 carried by the frame 34.

Also mounted upon the carriage 21 is a second platform 42 similarly spaced from the carriage 21 by legs 43 and secured thereto by feet 44 and similarly carrying a tower 45 on which are supported by suitable frame-work 46 a similar pair of columns 47 through which pass two cables 48 leading from the winches 49 over the pulleys 50 and 51 through the columns 47 to grippers 52 which are similar in construction to the grippers 36.

Also positioned upon the carriage 21 are a plurality of rollers 53 supporting a circular table 54 which is retained in position by a plurality of vertical rollers 55. This table is provided with a plurality of apertures 56 each adapted to be positioned over a gripping device 57 to permit the gripping device 57 to be raised through the table 54 into contact with a mold carried thereon.

This gripping device 57 is more clearly shown in Figure 5 wherein it is shown as comprising a piston 58 mounted in a cylinder 59 to which fluid pressure may be admitted through a duct 60 to raise the piston 58 until the flange 61 engages shoulder 62 to prevent further movement at which time the hooks 63 and 64 pivotally carried by the piston 58 at 65 have been raised through the table 54. The hooks 63 are actuated by means of rods 66 secured to a cross-head 67 mounted on the plunger 68 of a solenoid 69 supported by a bracket 70 secured to the plunger 58, while the hooks 64 are operated by means of rods 94 secured to a cross-head 95 carried by the plunger 96 of a solenoid 97 mounted upon the cross-head 67.

Also mounted upon the carriage 21 are two concentric tubes 71 and 72 connected through a head 73 to a pair of hollow arms 74 and 75 which carry at their extremities hollow rings 76 and 77 each provided with a plurality of openings 78 whereby fluid directed into the tubes 71 will be forced out through the openings 78 in the ring 76 while fluid directed into the tube 72 will be forced out through the openings 78 in the ring 77.

The towers 28 and 45, the table 54, the winches 32 and 49, and the carriage 21 may all be operated in any suitable manner. For example the towers 28 and 45 may each be operated by suitably actuated gearing meshing with gears 79 and 80 unitary with the towers 28 and 45 respectively, while the table 54 may be operated by a pinion 81 driven in any suitable manner as by an electric motor and meshing with teeth 82 on the periphery of the table 54. The winches 32 and 49 may be operated by suitable electric motors 83 mounted on platforms 84 and 85 supported by the towers 28 and 45 respectively while the carriage 21 may be moved along the track 22 manually or by means of a motor connected to one or more of the wheels 86 supporting the carriage 21.

In operation the platform 21 is moved along the track 22 until it is opposite a heater which is to be unloaded and a heater which is to be loaded. The tower 28 is then rotated to position one of the grippers 33 over the heater which is to be unloaded after which the winch 32 corresponding to that gripper is released to permit the gripper to descend on to the top mold whereupon the solenoid 40 of that gripper is actuated to cause the fingers 36 of the gripper to engage beneath a rim 87 upon the upper half 88 of the mold 89. The winch 32 is then operated to raise the gripper 33 which carries with it the entire mold 89 after which the tower 28 is rotated to carry the mold from the position "A" to the position "B" at which the winch 32 is again released to permit the mold 89 to be positioned upon the table 54 over one of the apertures 56 therein. The cylinder 58 is then raised through the table 54 and its hooks 63 and 64 actuated to grip respectively a ring 90 upon the lower half 91 of the mold 89 and a ring 92 carried by the core or other internal molding device 93. After these hooks 63 and 64 are in position the winch 32 is again actuated to again lift the top half of the mold 88 of the mold 89 but this time the lower half of the mold 91 and the internal molding device 93 are both held against movement with the top half 88 so that the action of the winch 32 now raises the top half 88 only and accordingly breaks the mold. The tower 28 is then rotated into position "C" in which the second column 30 is in position "A" and ready to begin the cycle which is being described for the first column 30 and its associated parts.

After the tower 28 has been rotated into this position the solenoid 97 is de-energized to release the hooks 64 from their engagement with the internal molding device 93 while the tower 45 is rotated to position one of the columns 47 in position "B" and the other column 47 in position "E" whereupon the grippers 52 of the two columns 47 are lowered and the fingers 98 extended so that the fingers 98 of the first gripper 52 will engage the ring 92 of the internal molding device of the tire in position "B" and the fingers 98 of the second gripper 52 will engage a similar ring 92 of an internal molding device 93 positioned within a raw tire lying on the conveyor belt 99. Both grippers 52 will then be raised whereupon the internal molding device 53 in position "B" and carrying a cured tire and the internal molding device 93 in position "E" and carrying a raw tire will both be raised. The solenoid 69 is then de-energized to release the fingers 63 after which the entire cylinder 57 is depressed below the table 54 after which the table 54 is actuated to carry the lower half 91 of the mold 89 into position "C" whereupon the ring 77 is passed between the two halves of the mold 89 as they lie in position "C" and soapstone bearing fluid emitted from the openings 78 in the ring 77 to thoroughly dust both halves of the mold 89 after which the ring 76 is swung between the two halves of the molds 89 and compressed air emitted to thoroughly clean both halves of the mold. The upper half 88 of the mold 89 is then swung onto a temporary position "CX" after which the tower 45 is rotated to move the first column 47 from the position "B" to the position "F" and the second column 47 from the position "E" to the position "C" whereupon both grippers 52 are lowered and the fingers 98 thereof retracted to permit the internal molding device and cured tire carried by the first gripper and lying in position "F" to drop upon the conveying belt 99 and the internal molding device and raw tire carried by the second gripper 52 and lying in position "C" to drop onto the lower half 91 of the mold 89. The tower 45 is then rotated to return the columns 47 to initial position after which the tower 28 is rotated to return the upper half 88 of the mold 89 to position "C" wherein it is lowered onto the lower half 91 and internal molding device 93 and raw tire.

After the mold has been reassembled the head 33 is further lowered to cause the hooks 36 to engage the ring 90 of the lower half of the mold 89 after which the gripper 33 is raised and the tower 28 rotated to move the gripper into position "D" wherein the gripper is lowered to deposit the mold in the heater which is to be loaded and the solenoid 40 de-energized to release the fingers 36 and permit retraction of the gripper 33.

This cycle is continued until the heater to be unloaded has been completely unloaded and the heater to be loaded has been completely loaded from the molds unloaded from the heater to be unloaded after which the entire carriage 21 is moved to the next position and the heater which has been unloaded is loaded from the succeeding heater.

If the heaters are arranged in a circle the above procedure may be continued indefinitely. Usually, however, it is more convenient to arrange the heaters in a long row and in such case it becomes necessary to provide means for loading the final heater and for disposing of the molds unloaded from the first heater. I find that I may provide such means in the manner shown in the drawings wherein I show a chute 100 positioned in advance of the first heater and adapted to receive the molds unloaded from the first heater after they have been completely reloaded ready to be replaced in a heater and convey these molds onto a conveyor belt 101 which deposits them upon a second chute 102 which carries them into the final heater and in this manner loads the final heater with the molds unloaded from the initial heater.

Under certain circumstances it becomes necessary to replace a mold and in such case the new mold will be substituted for the old mold at any convenient point on the cycle for example the lower half may be substituted at the point "C" while the upper half may be substituted between the points "B" and "C" or at the point "CX". The raw tire may be positioned onto the conveyor belt 99 and the cured tires removed therefrom in any desired manner. If desired electro-magnets may be installed in the grippers 33 and 52 to raise the molds and internal molding device by electro-magnetic attraction.

I have described herein one embodiment of my invention and the operation thereof and certain further matter in connection therewith. This disclosure, however, is illustrative only and my invention is, of course, not limited thereto.

I claim:

1. A device of the character described comprising a rotatable table and a rotatable support provided with grippers, the paths of movement of said table and grippers intersecting at two points.

2. A device of the character described comprising a rotatable table, a rotatable support provided with grippers, the paths of movement of said table and grippers intersecting at two points and means at one of said points, cooperating with said grippers to separate the halves of a mold carried by said grippers.

3. A device of the character described comprising a rotatable table, a rotatable support provided with grippers adapted to carry a mold, the paths of movement of said table and grippers intersecting at two points, means at one of said points cooperating with said grippers to separate the halves of said mold. means to remove an article from said mold and means at the other of said points to insert an article in said mold.

4. A device of the character described comprising a rotatable table, a rotatable support provided with grippers, the paths of movement of said table and grippers intersecting at two points, said grippers adapted to remove a mold from a heater to the first of said points of intersection, means operable at said point to remove an article from said mold, means at the other of said points of intersection to insert an article in said mold, said grippers adapted to carry said mold from the last named point to an adjacent heater.

5. A device as in claim 4 provided with means at said second point of intersection to apply different fluids to said mold.

6. A device of the character described comprising a rotatable table, a rotatable support provided with grippers, the paths of movement of said table and grippers intersecting at two points, said grippers adapted to remove a mold from a heater to the first of said points of intersection, means operable at said point to separate the mold halves and remove an article from said mold, means at the other of said points of intersection to insert an article in said mold, said grippers adapted to reassemble the mold halves and to carry said mold from the last named point to an adjacent heater.

7. A device of the character described comprising a rotatable table, a rotatable support provided with grippers adapted to carry a mold, the paths of movement of said table and grippers intersecting at two points, means at one of said points cooperating with said grippers to separate the halves of said mold, a second rotatable support provided with grippers the path of movement of said second support intersecting the path of movement of said table at the two points before mentioned and adapted at the first of said points to remove an article and at the second of said points to insert an article in said mold.

8. A device of the character described comprising a rotatable table, a rotatable support provided with vertically movable grippers adapted to transport a tire mold and enclosed tire from a heater to said table, said grippers engaging the flange of the upper half of the mold, independently actuated grippers, positioned to operate through an aperture in said table and adapted to engage respectively the flanges of the tire support and the lower half of the mold, means to move the first named grippers vertically to remove the top half of the mold, means to release the grippers engaging the tire support and means to remove the tire support with the tire therein from the lower half of the mold while the latter is retained on said table by the grippers engaging the flange thereof.

9. A device of the character described comprising a conveyor traveling in a closed path and two rotatable supports each having a pair of oppositely extending arms, the arms of each support intersecting the conveyor at two points.

10. A device of the character described comprising a conveyor traveling in a closed path and two rotatable supports each having a pair of oppositely extending arms the arms of both supports intersecting the conveyor at two points, said points being the same for both supports.

11. A device of the character described comprising a circular conveyor and two rotatable supports positioned adjacent the conveyor, the supports being each provided with a pair of oppositely extending arms the arms of both supports intersecting the conveyor at two substantially diametrically opposite points in the path of the conveyor's travel.

In testimony whereof I have signed my name to the above specification.

GEORGE J. MEAD.